UNITED STATES PATENT OFFICE.

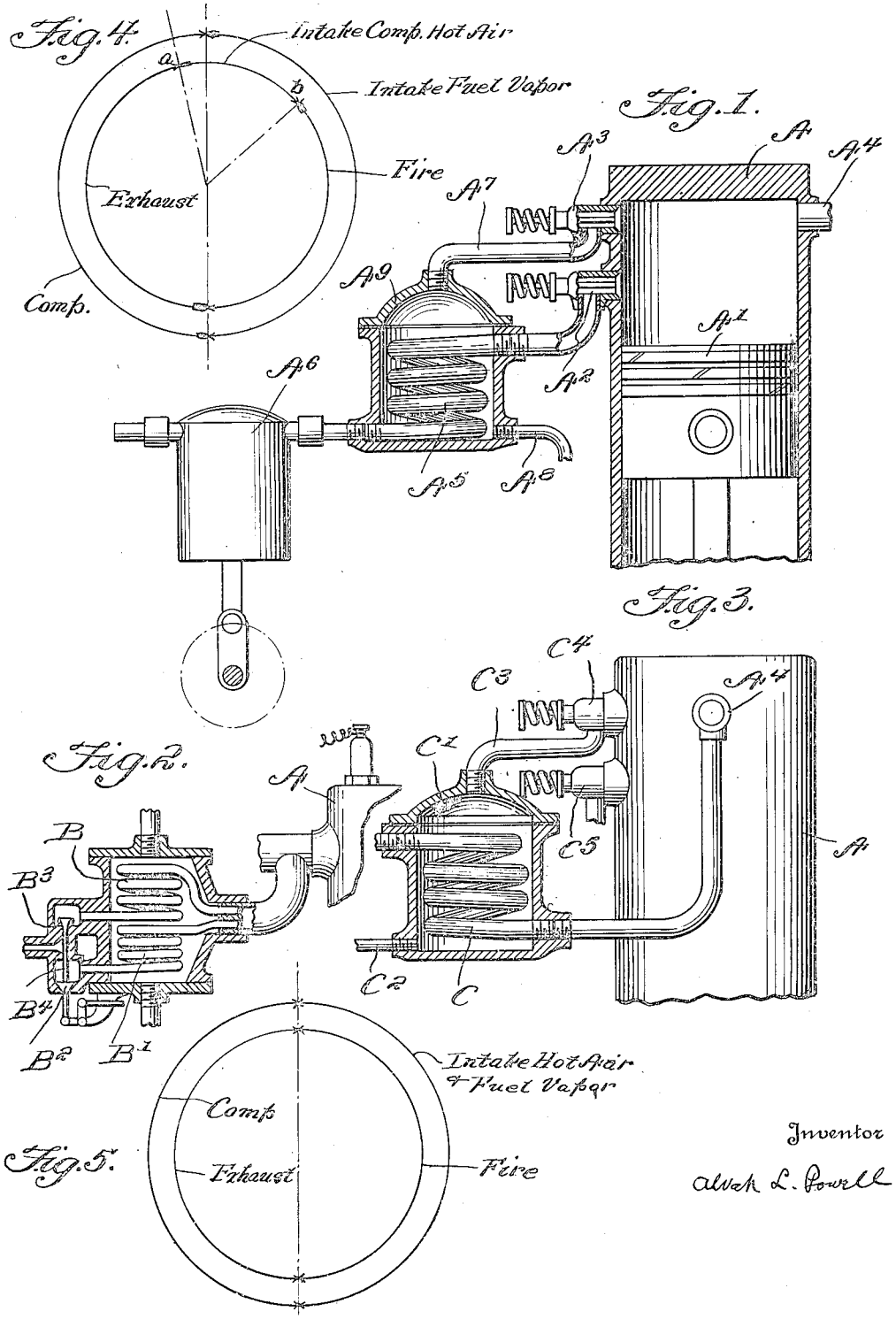

ALVAH L. POWELL, OF MILES CITY, MONTANA, ASSIGNOR TO THE A. L. POWELL POWER CO., INC., OF MILES CITY, MONTANA, A BODY CORPORATE.

CARBURETOR.

Application filed February 2, 1921, Serial No. 441,982. Renewed August 17, 1923.

*To all whom it may concern:*

Be it known that I, ALVAH L. POWELL, a citizen of the United States, residing at Miles City, in the county of Custer and State of Montana, have invented certain new and useful Improvements in Carburetors, of which the following is a specification.

My invention relates to improvements in carburetors in which I utilize the heat of air, independently compressed for the combustion chamber, for vaporizing the fuel and for firing the same. In the annexed drawings I show a form of my improvement, and modifications thereof.

Fig. 1 is an elevation, in section, of my improvement.

Figs. 2 and 3 are similar views, showing modifications of the invention.

Figs. 4 and 5 are diagrams of the cycles.

In Fig. 1, an internal combustion engine, A, is shown, with piston $A^1$, and operable inlet valves $A^2$, $A^3$, and an exhaust valve, $A^4$. From valve $A^2$ a pipe passes to a coil, $A^5$, in a chamber, $A^9$. The coil $A^5$ communicates with an air compressor, $A^6$, as shown. From head of chamber $A^9$ a pipe, $A^7$, communicates with operable valve $A^3$. An inlet pipe, $A^8$, leads to a fuel supply, not shown.

At a point on the return stroke of piston $A^1$, valve $A^3$ opens and a fuel charge enters cylinder from the chamber $A^9$. This fuel has been vaporized by the heat radiating from the coils $A^5$, due to the high compression of the contained air. On succeeding stroke, at a point $a$ on diagram, Fig. 4, valve $A^2$ opens and a charge of highly compressed air is admitted. Valve $A^2$ closes at a point $b$ on diagram, Fig. 4. By reason of the temperature of the intaken air, this temperature being due to its own compression in the compressor $A^6$, the total charge is fired. On outstroke, power is developed. On next upstroke engine exhausts. The engine can be either two or four cycle but the latter is preferably used.

In Fig. 2 I show a modification of the previous construction. In this the exhaust from engine heats incoming air and fuel, respectively, in the coils B, $B^1$. An air inlet valve, $B^2$, is connected with a fuel needle valve, $B^3$, by the stem $B^4$. Air at atmospheric pressure is drawn in on suction stroke of engine, and fuel enters at the same time, the said valves, $B^2$, $B^3$, acting together when moved by operable means. Diagram, Fig. 5, shows the operative cycle.

In Fig. 3 the engine exhaust passes out through a coil, C, in a closed chamber, $C^1$. The chamber contains fuel that enters at $C^2$ from any source. The exhaust heat vaporizes the fuel, which passes to the engine through pipe $C^3$ and operable valve $C^4$. Air for engine, already compressed, enters through operable valve, $C^5$. It is assumed that the temperature of the incoming air has been raised to ignition point by high compression.

What I believe is new and ask to have protected by Letters Patent is—

In an internal combustion engine, the combination of a power means, a power cylinder, a piston, operable intake and exhaust valves, an air compressor, a boiler, a coil in said boiler, communicating means from air compressor to said coil and to an operable valve on power cylinder, communicating means from boiler to a fuel supply, communicating means from boiler to an operable valve on power cylinder, and means for admitting charges to said cylinder from said boiler and of igniting them by highly compressed air from said coil, substantially as described.

In testimony whereof I affix my signature.

ALVAH L. POWELL.